US012609465B2

(12) United States Patent
Gebhardt et al.

(10) Patent No.: US 12,609,465 B2
(45) Date of Patent: Apr. 21, 2026

(54) CLAMPING SPRING, CONNECTING ASSEMBLY, AND CONNECTING TERMINAL

(71) Applicant: Phoenix Contact GmbH & Co. KG, Blomberg (DE)

(72) Inventors: Martin Gebhardt, Lage (DE); Karsten Nolte, Lemgo (DE); Olaf Schyrocki, Bad Pyrmont (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 401 days.

(21) Appl. No.: 18/557,301

(22) PCT Filed: Apr. 21, 2022

(86) PCT No.: PCT/EP2022/060514
§ 371 (c)(1),
(2) Date: Oct. 26, 2023

(87) PCT Pub. No.: WO2022/228983
PCT Pub. Date: Nov. 3, 2022

(65) Prior Publication Data
US 2024/0204429 A1 Jun. 20, 2024

(30) Foreign Application Priority Data
Apr. 29, 2021 (LU) .................................. LU102793

(51) Int. Cl.
*H01R 4/48* (2006.01)

(52) U.S. Cl.
CPC ......... *H01R 4/4833* (2023.08); *H01R 4/4821* (2023.08); *H01R 4/4835* (2023.08); *H01R 4/485* (2023.08)

(58) Field of Classification Search
CPC .. H01R 4/4833; H01R 4/4821; H01R 4/4835; H01R 4/485
See application file for complete search history.

(56) References Cited

U.S. PATENT DOCUMENTS 4,767,340 A * 8/1988 Hohorst ............... H01R 13/501 439/828
6,743,061 B2 * 6/2004 Jaegerskuepper ... H01R 4/4842 439/834

(Continued)

FOREIGN PATENT DOCUMENTS

CN 110838643 A * 2/2020 ........... H01R 13/629
DE 202014103797 U1 11/2014

(Continued)

*Primary Examiner* — Travis S Chambers
(74) *Attorney, Agent, or Firm* — LEYDIG, VOIT & MAYER, LTD.

(57) ABSTRACT

A clamping spring for clamping a conductor to be connected against a current bar includes: a retaining leg; a clamping leg movable into an open position and into a clamping position; and a locking leg movable into a retaining position and into a releasing position. In the retaining position, the locking leg is retained on an actuating element, and, in the releasing position, the locking leg is released from the actuating element. The locking leg has a pressing surface, by which the locking leg is movable from the retaining position into the releasing position by the conductor. The pressing surface has a portion which is curved in a direction of the clamping leg and on which comprises a first conductor contact surface.

13 Claims, 3 Drawing Sheets

(56) References Cited

U.S. PATENT DOCUMENTS

| | | | | | |
|---|---|---|---|---|---|
| 7,329,143 | B2 * | 2/2008 | Schrader | H01R 4/485 |
| | | | | 439/441 |
| 2016/0197416 | A1 * | 7/2016 | Jarmuth | H01R 4/4833 |
| | | | | 439/342 |
| 2018/0331449 | A1 * | 11/2018 | Juelich | H01R 4/4821 |
| 2022/0158368 | A1 | 5/2022 | Berghahn | |
| 2022/0336971 | A1 | 10/2022 | Gebhardt | |
| 2024/0213694 | A1 * | 6/2024 | Gebhardt | H01R 4/4833 |

FOREIGN PATENT DOCUMENTS

| | | | | | |
|---|---|---|---|---|---|
| DE | 202016007200 | U1 | | 10/2017 | |
| DE | 102019121581 | A1 | | 2/2021 | |
| DE | 102022132730 | A1 | * | 6/2024 | H01R 4/4833 |
| DE | 202024101047 | U1 | * | 6/2025 | H01R 4/4811 |
| DE | 202024101063 | U1 | * | 6/2025 | H01R 4/4809 |
| EP | 2768079 | A1 | | 8/2014 | |
| EP | 2947718 | A1 | | 11/2015 | |
| EP | 3849018 | B1 | * | 9/2024 | H01R 4/485 |
| LU | 502537 | B1 | * | 1/2024 | H01R 4/4835 |
| WO | 2017072092 | A1 | | 5/2017 | |

* cited by examiner

CLAMPING SPRING, CONNECTING ASSEMBLY, AND CONNECTING TERMINAL

CROSS-REFERENCE TO PRIOR APPLICATIONS

This application is a U.S. National Phase application under 35 U.S.C. § 371 of International Application No. PCT/EP2022/060514, filed on Apr. 21, 2022, and claims benefit to Luxembourg Patent Application No. LU 102793, filed on Apr. 29, 2021. The International Application was published in German on Nov. 3, 2022 as WO/2022/228983, under PCT Article 21(2).

FIELD

The invention relates to a clamping spring for clamping a conductor, which is to be connected, against a current bar. The invention also relates to a connecting assembly, a connecting terminal, and an electronic device.

BACKGROUND

Such connection assemblies usually have a clamping spring designed as a leg spring, which clamping spring has a holding leg and a clamping leg, wherein a conductor inserted into the connection assembly can be clamped against the current bar by means of the clamping leg of the clamping spring. If, in particular, flexible conductors are clamped, the clamping spring must already be moved, before insertion of the conductor, into an open position by means of an actuating element and thus be actuated in order to pivot the clamping spring or the clamping leg away from the current bar so that the conductor can be inserted into the intermediate space designed as a conductor connection space between the current bar and the clamping spring. Only in the case of rigid and thus robust conductors can the conductor apply sufficient force to the clamping spring or the clamping leg of the clamping spring to be able to pivot the clamping leg away from the current bar without the actuating element having to be actuated for this purpose by a user. With flexible conductors, the user must first pivot the clamping spring away from the current bar by actuating the actuating element so that the flexible conductor can be inserted. Here, the actuating element usually presses against the clamping leg of the clamping spring in order to pivot the clamping leg away from the current bar and release the conductor connection space. The actuating element is then usually held manually in this open position until the flexible conductor is inserted into the conductor connection space and can be clamped against the current bar. If the flexible conductor is inserted into the conductor connection space, the actuating element must be actuated again in order to move the clamping spring or the clamping leg from the open position into the clamping position and to clamp the conductor against the current bar.

SUMMARY

In an embodiment, the present invention provides a clamping spring for clamping a conductor to be connected against a current bar, the clamping spring comprising: a retaining leg: a clamping leg movable into an open position and into a clamping position: and a locking leg movable into a retaining position and into a releasing position, wherein, in the retaining position, the locking leg is retained on an actuating element, and, in the releasing position, the locking leg is released from the actuating element, wherein the locking leg has a pressing surface, by which the locking leg is movable from the retaining position into the releasing position by the conductor, and wherein the pressing surface has a portion which is curved in a direction of the clamping leg and on which comprises a first conductor contact surface.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
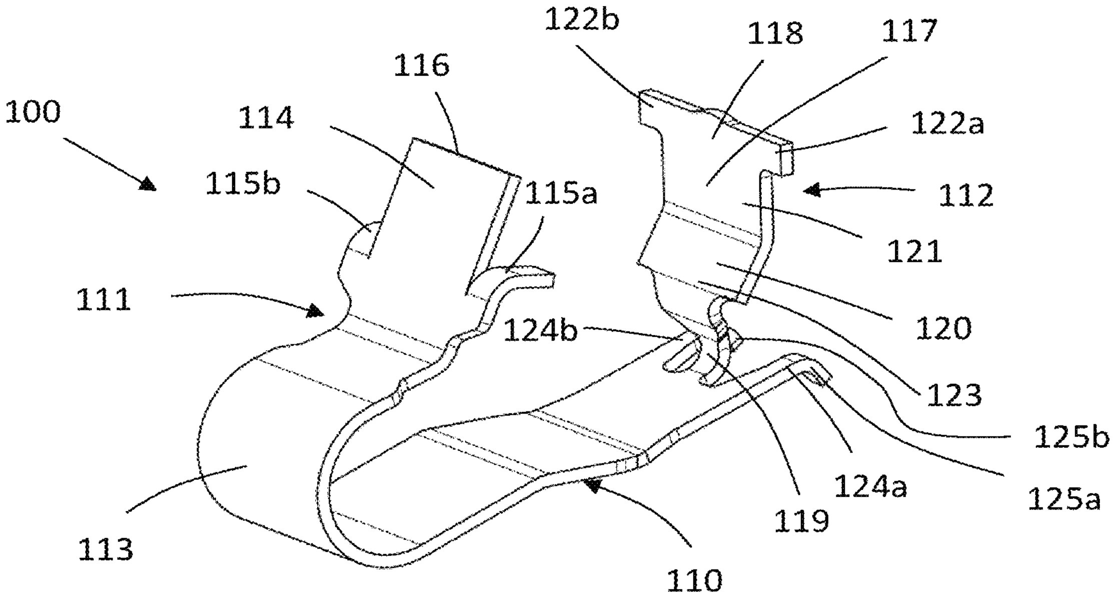
FIG. 1 shows a schematic representation of a clamping spring according to the invention.

In an embodiment, the present invention provides a clamping spring, a connecting assembly, a connecting terminal, and an electronic device which are characterized by simplified handling during the connecting of, in particular, a flexible conductor.

The clamping spring according to the invention has a retaining leg, a clamping leg, which can be moved into an open position and into a clamping position, and a locking leg, which can be moved into a retaining position and into a releasing position, wherein, in the retaining position, the locking leg is retained on an actuating element, and, in the releasing position, the locking leg is released from the actuating element, wherein the locking leg has a pressing surface, by means of which the locking leg can be moved from the retaining position into the releasing position by means of the conductor to be connected, wherein the pressing surface has a portion which is curved in the direction of the clamping leg and on which a first conductor contact surface is formed.

According to the invention, the clamping spring is designed as a leg spring, wherein the clamping spring has three legs: the clamping leg, the retaining leg, and the locking leg. When the clamping leg is in the open position, in which a conductor to be connected can be inserted into or removed from the conductor connection space, the locking leg is in a retaining position, in which the locking leg is retained on the actuating element, by means of which the clamping leg can be moved from the clamping position into the open position. In the open position, the clamping leg can apply a first compressive force to the actuating element, and the locking leg can, in its retaining position, apply a second compressive force, which acts opposite to the first compressive force, to the actuating element. In the open position, the actuating element is thus braced with the clamping spring. Due to the braced arrangement of the actuating element with the clamping spring in the open position of the clamping spring, the actuating element can be held automatically in this position in order to hold the clamping spring in the open position. The actuating element and the clamping spring support one another in the open position. The actuating element and the clamping spring can thus form a self-contained force system in the open position of the clamping spring so that, in the open position of the clamping spring, the actuating element can be held in a fixed position relative to the clamping spring by the force of the clamping spring, without the actuating element having to be held manually or by means of a tool in this position. In order to enable tool-free connection of conductors having a small conductor cross-section—in particular, flexible conductors—the locking leg can have a pressing surface, wherein, for moving the clamping spring from the open position into the clamping position, the pressing surface can be actuated by the conductor to be connected and can be disengaged from the actuating element by the actuation of the pressing surface of the locking legs. The pressing surface can be arranged in extension of a conductor insertion opening of a housing of a connecting terminal so that the conductor abuts against the pressing surface of the locking leg when the conductor is inserted into the connecting assembly or into the conductor connection space. By applying a pressure force to the pressure surface by means of the conductor, the latching leg can be put into a pivoting movement or tilting movement in the direction of the conductor insertion direction so that the latching leg can be pivoted or tilted away from the actuating element in the conductor insertion direction. As a result of the pivoting movement of the locking leg, the locking leg can be disengaged from the actuating element and can thus be released from the actuating element and moved into a releasing position so that the actuating element and thus the clamping leg of the clamping spring can be moved from the open position into the clamping position without manual assistance. By means of this special mechanism, a conductor, in particular a conductor with a small conductor cross-section and/or a flexible conductor can be connected in a particularly simple manner solely by the insertion movement of the conductor, without a user having to actuate further elements, such as the actuating element, on the connection assembly in order to release the clamping spring and move it from the clamped position into the open position. This facilitates the handling of the connection assembly and saves time when connecting a conductor. The bracing of the actuating element with the clamping spring in the open position of the clamping spring can thus be released or canceled by the conductor to be connected. The pressing surface is characterized in that it has a portion which is curved in the direction of the clamping leg and on which a first conductor contact surface is formed. By means of this portion, curved in the direction of the clamping leg, and the conductor contact surface formed thereon, it is possible that the locking leg can also be actuated by means of a conductor, to be connected, when said conductor tilts during the insertion into the conductor connection space and, in this tilted position, abuts against the locking leg. The first conductor contact surface is thus inclined or oblique relative to a desired conductor insertion direction. The conductor contact surface is preferably inclined at an angle of $45° \leq \beta \leq 80°$, and particularly preferably $60° \leq \beta \leq 70°$, to the desired conductor insertion direction. By means of this conductor contact surface which is formed on the curved portion and which is part of the pressing surface, conductors which deviate from the desired conductor insertion direction during insertion can also actuate the locking leg reliably and with enough force to move the locking leg from the retaining position into the releasing position without the need for additional aids. The conductor preferably abuts against the pressing surface in such a way that the end face of the conductor rests flat on the first conductor contact surface, so that the conductor can apply the highest possible triggering pressure to the first conductor contact surface and thus to the pressing surface of the locking leg. Because the first conductor contact surface is formed on a portion of the pressing surface, which portion is curved in the direction of the clamping leg, slipping of the conductor to be connected can be prevented during the actuating and thus the abutting against the locking leg.

The locking leg preferably has a free end, along which the pressing surface extends and on which a second conductor contact surface is formed. The second conductor contact surface formed at the free end is preferably aligned with the desired conductor insertion direction. If a conductor to be connected is inserted into the conductor connection space along the desired conductor insertion direction, the conductor to be connected abuts against the second conductor contact surface of the pressing surface in order to move the locking leg from the retaining position into the releasing position. The pressing surface can thus have two conductor contact surfaces which can receive conductors at different conductor insertion angles in order to actuate the locking leg. The second conductor contact surface is preferably adjacent to the first conductor contact surface.

The first conductor contact surface is preferably at an angle to the second conductor contact surface. The first conductor contact surface preferably extends at an angle of $140° \leq \alpha \leq 170°$, and particularly preferably at an angle of $145° \leq \alpha \leq 165°$, to the second conductor contact surface. Conductors which tilt during insertion into the conductor connection space and are not inserted along the desired conductor insertion direction, but, rather, at an inclination to the desired conductor insertion direction can thus be guided from the second conductor contact surface to the first conductor contact surface so that, regardless of the angle of the inserted conductor, the locking leg can be reliably actuated in order to move the locking leg from the retaining position into the releasing position.

The locking leg is preferably formed integrally with the retaining leg and thus with the clamping leg. The clamping spring can thus be formed, with its three legs, from one stamped and bent part.

The locking leg can be connected to the retaining leg by means of a connection portion. The connection portion is preferably designed such that it enables a resilient connection of the locking leg to the retaining leg, so that the locking leg is pivotable relative to the retaining leg. The connection portion is preferably curved. The connection portion is preferably curved such that the locking leg is bent from the retaining leg essentially at a 90° angle.

In order to be able to achieve a particularly good spring effect of the locking leg relative to the retaining leg, the locking leg preferably tapers in the connection region towards the retaining leg. The locking leg preferably has a substantially smaller width in the connection region than in the region of the pressing surface or in the region of the two conductor support surfaces of the pressing surface of the locking leg. Directly adjacent to the retaining leg, the connection region preferably has a width which is reduced by more than half in relation to the width of the pressing surface of the locking leg.

The clamping spring can be designed such that it can be connected in a positive-locking manner to a current bar of a connecting assembly. As a result, a self-clamping structural unit can be achieved between the clamping spring and the current bar, since, in the clamping position or initial position in which no conductor is inserted, the clamping leg can apply a compressive force against the current bar, and at the same time the clamping spring can be connected, by means of its retaining leg, to the current bar in a positive-locking manner.

To form the positive-locking connection between the clamping spring and the current bar, the retaining leg can have at least one retaining arm for retaining the retaining leg on a current bar. By means of the retaining arm, the retaining leg can engage in a positive-locking manner in the current bar, and in particular in an opening or cutout of the current bar. The retaining arm is preferably formed on the retaining leg such that the retaining arm projects beyond the connection portion.

In order to be able to form a particularly stable and in particular tilt-proof connection between the clamping spring and the current bar, the retaining leg can have a first retaining arm and a second retaining arm, between which the connection portion can be arranged. The two retaining arms are preferably symmetrical to one another. The two retaining arms preferably extend parallel to one another.

In an embodiment, the invention provides a connecting assembly for connecting an electrical conductor, which connecting assembly has a current bar, a clamping spring, and an actuating element, wherein the clamping spring is designed and developed as described above, and wherein the actuating element has a retaining contour for retaining the locking leg of the clamping spring in the retaining position.

In order to hold the latching leg on the actuating element in the open position of the clamping spring, the actuating element can have a holding contour. The holding contour enables a secure and defined holding of the latching leg on the actuating element in the open position of the clamping spring. In the region of the holding contour, the latching leg can apply the second pressure force on the actuating element in the open position of the clamping spring. The holding contour is preferably formed in the form of a special surface shaping on the actuating element itself.

The current bar can have at least one opening, into which the clamping spring can hook by means of the at least one retaining arm of the retaining leg. A positive-locking connection between the current bar and the clamping spring is thereby possible. Preferably, the retaining leg can have two retaining arms, and the current bar can have two openings arranged at a distance from one another, into each of which openings one of the two retaining arms can hook.

In an embodiment, the invention provides a connection clamp, and in particular a terminal block, which has a housing and at least one connection assembly arranged in the housing and formed and developed as described above. A conductor insertion opening can be formed on the housing, is formed flush with the conductor connection space of the connection assembly, and the conductor to be connected can be inserted via it into the housing and into the connection assembly. In particular in the case of a design as a terminal block which can be latched onto a support rail, two such connection assemblies can also be arranged in the housing.

Furthermore, in an embodiment, the invention provides an electronic device, which has at least one connection assembly formed and developed as described above and/or at least one connection clamp formed and developed as described above. The electronic device can, for example, be a switch cabinet, in which one or more support rails or mounting plates can be arranged, onto which several connecting terminals, and in particular terminal blocks, having corresponding connecting assemblies can be latched.

FIG. 1 shows a clamping spring 100. The clamping spring 100 is designed as a leg spring. The clamping spring 100 has a retaining leg 110, a clamping leg 111, and a locking leg 112. The clamping leg 111 is connected to the retaining leg 110 by means of an arcuate portion 113. The clamping leg 111 is pivotable relative to the retaining leg 110 so that, depending upon the position of the clamping leg 111, the clamping leg 111 and thus the clamping spring 100 can be moved into and positioned in an open position and a clamping position.

Figure 4:
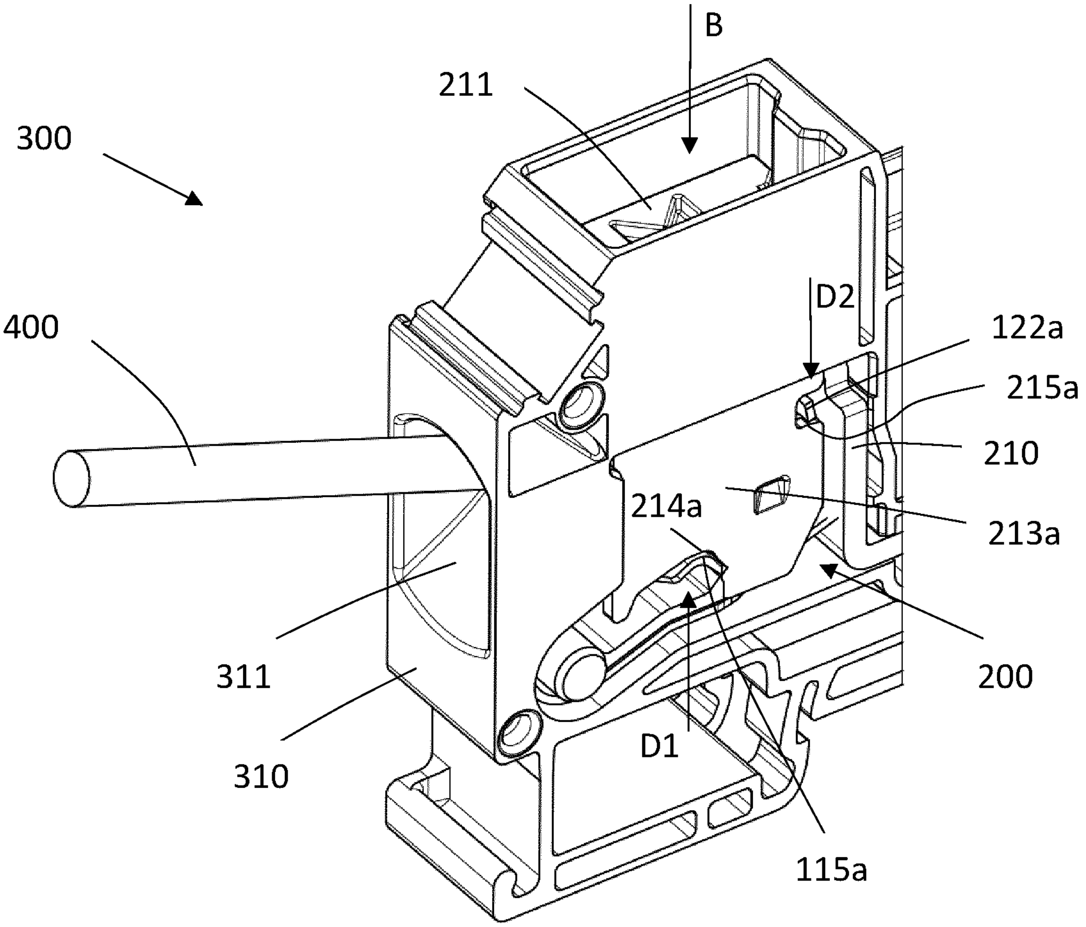
FIG. 4 shows a schematic representation of a connecting terminal with an inserted conductor.
Figure 5:
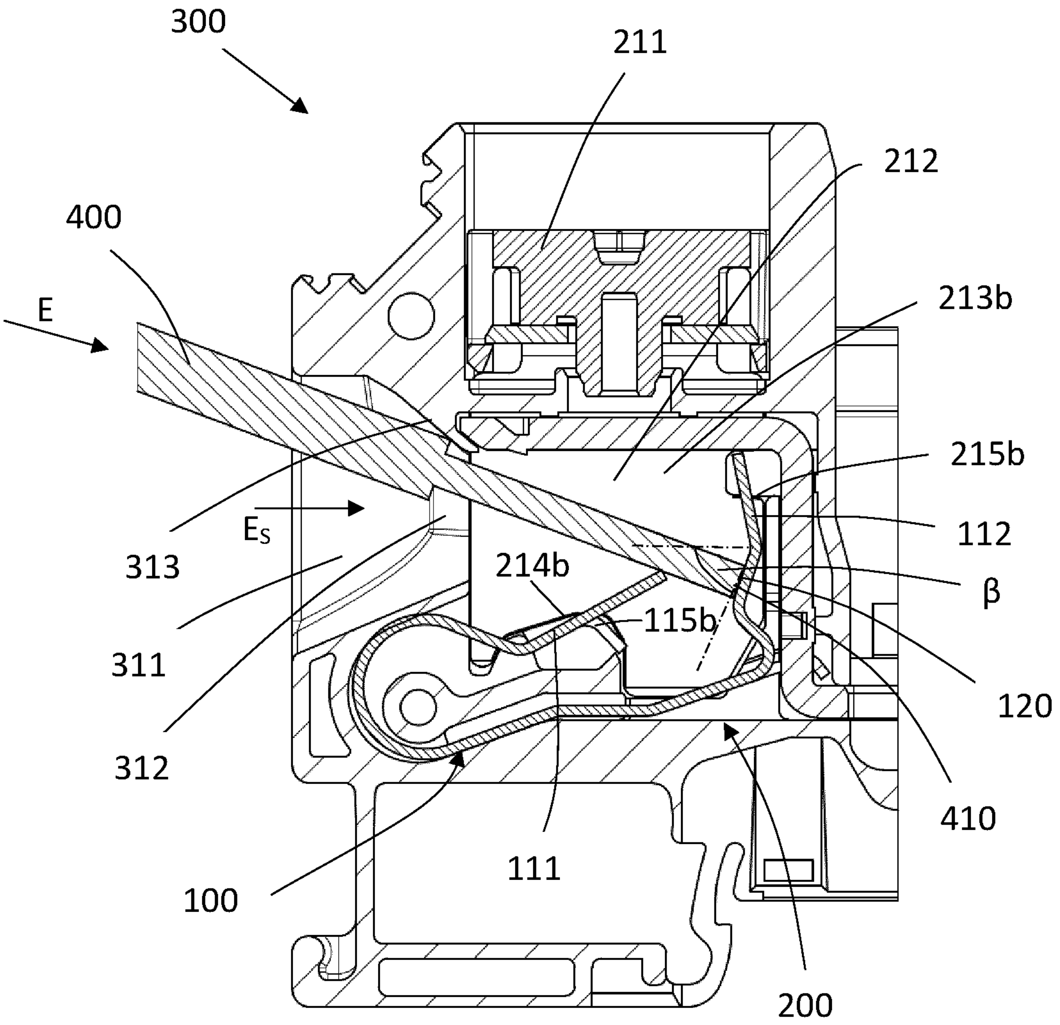
FIG. 5 shows a schematic sectional representation of the connecting terminal shown in FIG. 4.

The clamping leg is moved from the clamping position into the open position by means of an actuating element 211 (which is shown in FIGS. 4 and 5) of a connecting assembly 200.

The actuating element 211 is guided purely linearly in a housing 310 of a connecting terminal 300, as it is shown in FIGS. 4 and 5. When the clamping spring 100 is actuated in order to move the clamping leg 111 from the clamping position into the open position, the actuating element 211 is moved in the actuation direction B, in which the actuating element 211 is moved towards the clamping spring 100. The actuating element 211 interacts with the clamping leg 111 of the clamping spring 100 in that the actuating element 211 exerts a force on the clamping leg 111 in the actuation direction B so that the clamping leg is pivoted towards the retaining leg 110 in order to release the conductor connection space 212 formed between the clamping leg 111 of the clamping spring 100 and the current bar 210 of the connecting assembly 200.

In the embodiment shown here, the actuating element 211 has a U-shaped cross-section. The actuating element 211 has two actuating arms 213*a*, 213*b* extending parallel to one another. Between the two actuating arms 213*a*, 213*b*, a free space is formed, through which the conductor 400 to be connected can be guided. The two actuating arms 213*a*, 213*b* are designed with such a length that they laterally delimit the conductor connection space 212 and thus can form a lateral guide for the conductor 400 to be connected, as can be seen in FIGS. 4 and 5.

On the edge surfaces which belong to the actuating arms 213*a*, 213*b* and which face the clamping spring 100, respective actuating surfaces 214*a*, 214*b* are formed, which interact with the clamping leg 111 to actuate the clamping leg 111 of the clamping spring 100. With its two actuating surfaces 214*a*, 214*b*, the actuating element 211 contacts the clamping leg 111 of the clamping spring 100 when the clamping leg is being moved from the clamping position into the open position.

The clamping leg 111 has a clamping tab 114 and two side tabs 115*a*, 115*b* arranged laterally to the clamping tab 144. The clamping tab 114 has, at its free end, a clamping edge 116, by means of which the conductor 400 to be connected is clamped against the current bar 210.

The clamping tab 114 is arranged between the two side tabs 1115*a*, 115*b*. The clamping tab 114 is longer than the two side tabs 115*a*, 115*b* so that the clamping tab 114 extends beyond the two side tabs 115*a*, 115*b*. The two side tabs 115*a*, 115*b* each have an arcuate shape. The two side tabs 115*a*, 115*b* can thus form respective runners which can slide along the actuating surfaces 214*a*, 214*b* during the interaction with the actuating element 211. For actuating the clamping spring 100, the actuating element 211 is thus in direct contact with the two side tabs 115*a*, 115*b* of the clamping spring 100, whereas the clamping tab 114 does not have direct contact with the actuating element 211. The clamping tab 114 is arranged in the free space formed between the two actuating arms 213*a*, 213*b*.

The third leg of the clamping spring 110, the locking leg 112, is connected to the retaining leg 110, so that the retaining leg 110 is thus arranged between the clamping leg 111 and the locking leg 112. In the embodiment shown here, the locking leg 112 extends away from the retaining leg 110 essentially at a right angle. The locking leg 112 is designed with such a length that it projects, starting from the retaining leg 110, beyond the clamping leg 111, at least when the clamping leg 111 is in the open position. The locking leg 112 serves, inter alia, to help hold the clamping spring 100 in the open position.

The locking leg 112 extends, starting from the retaining leg 110, towards the conductor connection space 212, wherein the conductor 400 to be connected is inserted into this conductor connection space 212 in order to connect the conductor 400 and clamp it against the current bar 210. The locking leg 112 is designed with such a length that it delimits the conductor connection space 212 in the conductor insertion direction E, $E_s$. When a conductor 400 is inserted into the conductor connection space 212 via a conductor insertion opening 311 formed in the housing 310, the conductor 400 abuts against the locking leg 112, as a result of which the locking leg 112 can be deflected or pivoted in the conductor insertion direction E, $E_s$.

The locking leg 112 is held, at its free end 118, on the actuating element 211—in particular, on the two actuating arms 213*a*, 213*b* of the actuating element 211, and in particular locked on the actuating element 211.

As can be seen in FIG. 1, the free end 118 of the locking leg 112 has a T-shape, since the free end 118 has two, laterally outward-projecting retaining arms 122*a*, 122*b*. In the open position, the locking leg 112 is retained with its first retaining arm 122*a* on the first actuating arm 213*a*, and with its second retaining arm 122*b* on the second actuating arm 213*b*, as can be seen in FIGS. 4 and 5.

In order to be able to ensure positionally secure and therefore defined retaining of the locking leg 112 on the actuating element 211 in the open position, a retaining contour 215*a*, 215*b* is formed on each of the two actuating arms 213*a*, 213*b*. The retaining contour 215*a*, 215*b* is formed at a distance from the actuating surfaces 214*a*, 214*b* on the actuating element 211. In the open position, the two retaining arms 122*a*, 122*b* of the locking leg 112 are in contact with the retaining contour 215*a*, 215*b* of the actuating arms 213*a*, 213*b* in order to retain the locking leg 112 in a stationary position.

The locking leg 112 has a pressing surface 117 facing the conductor connection space 212, against which pressing surface the conductor 400 can abut when inserted into the conductor connection space 212, in order to release the locking leg 112 from the retaining contour 215*a*, 215*b* of the actuating element 211 and thus to move the locking leg from the retaining position into the releasing position. The pressing surface 117 extends over a large part of the length of the locking leg 112. The pressing surface 117 extends from the free end 118 of the locking leg 112 to a connection portion 119 of the locking leg 112, by means of which the locking leg 112 is connected to the retaining leg 110.

The pressing surface 117 has a first conductor contact surface 120 and, directly adjacent to the first conductor contact surface 120, a second conductor contact surface 121, against which the conductor 400 to be connected can abut and can rest with its end face 410 in order to be able to move the locking leg 112 from the retaining position into the releasing position.

The second conductor contact surface 121 is formed in the region of the free end 118 of the locking leg 112. The second conductor contact surface 121 is aligned with a desired conductor insertion direction $E_s$, as can be seen in FIG. 5, so that a conductor 400 which is inserted straight via the conductor insertion opening 311 of the connecting terminal 300 abuts against this second conductor contact surface 121 and thereby releases the locking leg 112 from the locking with the actuating element 211, so that the locking leg 112 can be moved from the retaining position into the releasing position.

The first conductor contact surface 120 is formed on a portion 123 of the pressing surface 117 of the locking leg 112, which portion is curved in the direction of the clamping leg 111. The first conductor contact surface 120 is thus oriented at an angle to the second conductor contact surface 121. In the embodiment shown here, as can be seen for example in FIG. 3, the first conductor contact surface 120 extends at an angle $\alpha=\pm165°$ to the second conductor contact surface 121. The first conductor contact surface 120 is just out of alignment with the conductor insertion opening 311. If the connecting assembly 200 is installed in a connecting terminal 300, the first conductor contact surface 120 is arranged somewhat below the mouth 312 of the conductor inlet opening 311 into conductor connection space 212 in the actuation direction B of the actuating element 211, as can be seen in FIG. 5.

Due to the curved portion 123 and the first conductor contact surface 120 formed thereon, it is possible for the locking leg 112 to also be actuated by means of the conductor 400 to be connected when said conductor tilts during the insertion into the conductor connection space 212 and, in this tilted position, i.e., the conductor insertion direction E shown here, abuts against the locking leg 112, as can be seen in FIG. 5. The first conductor contact surface 120 is thus inclined or oblique relative to the desired conductor insertion direction $E_s$. Here, the first conductor contact surface 120 is oriented and inclined at an angle $\beta=\pm60°$ to the desired conductor insertion direction $E_s$.

The locking leg 112 is resiliently connected to the retaining leg 110 so that the locking leg 112 can be deflected in the event of actuation by means of the conductor 400 to be connected, in order to be moved from the retaining position into the releasing position. The connection to the retaining leg 110 is formed by the connection portion 119. The connection portion 119 is formed at an end portion, opposite from the free end 118, of the locking leg 112. The connection portion 119 leads into the curved portion 123 of the pressing surface 117.

The connection portion 119 is designed such that it tapers towards the retaining leg 110. The connection portion 119 thus has the smallest width in the region of the connection of the connection portion 119 to the retaining leg 110. In the embodiment shown here, the connection portion 119 has a curved shape. The connection portion 119 is integrally connected to the retaining leg 110 approximately at the center of the width of the retaining leg 110.

Figure 2:
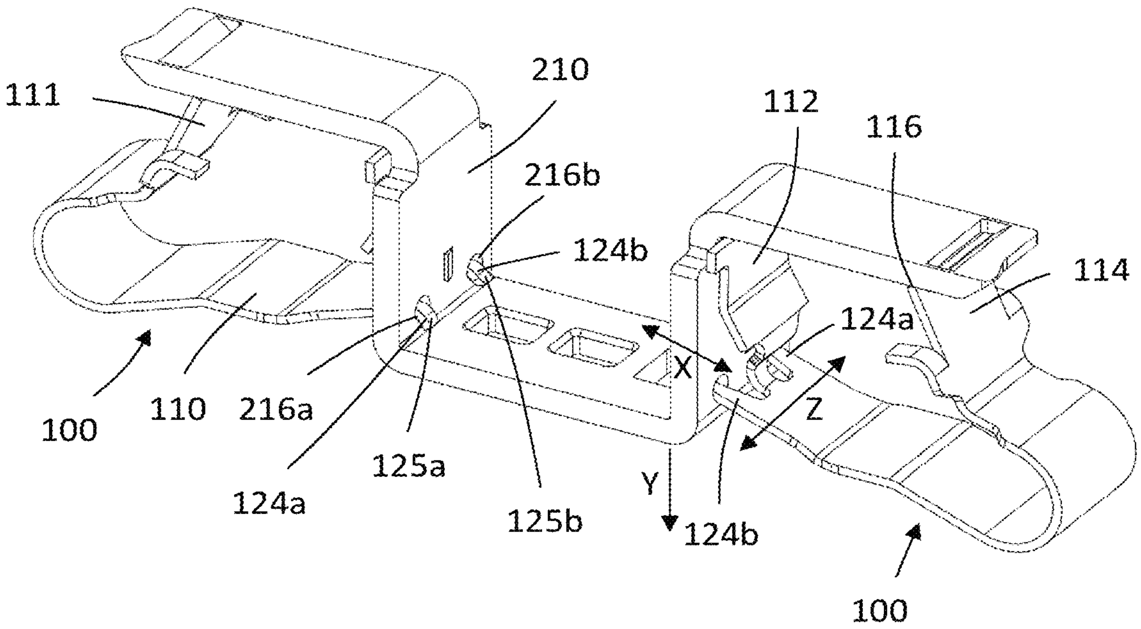
FIG. 2 shows a schematic representation of an arrangement with a current bar and two clamping springs, like the clamping spring shown in FIG. 1, arranged on the current bar.
Figure 3:
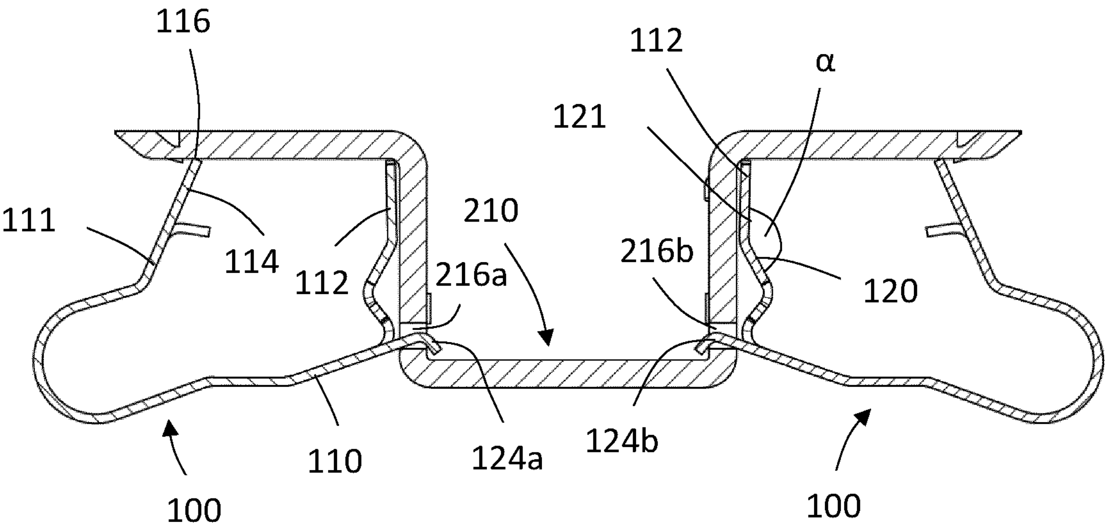
FIG. 3 shows a schematic sectional representation of the arrangement shown in FIG. 2.

The retaining leg 110 has two retaining arms 124*a*, 124*b*, by means of which the retaining leg 110 and thus the clamping spring 100 can be fastened to the current bar 210) in a positive-locking manner, as can be seen in FIGS. 2 and 3. The two retaining arms 124*a*, 124*b* are formed at an end portion of the retaining leg 110, at which end portion the locking leg 112 is also connected to the retaining leg 110. The two retaining arms 124*a*. 124*b* are arranged at a distance from one another, wherein the connection portion 119 of the locking leg 112 is connected to the retaining leg 110 in a free space formed between the two retaining arms 124*a*, 124*b*.

The two retaining arms 124*a*, 124*b* of the retaining leg 110 are symmetrical to one another and extend parallel to one another. A free end 125*a*, 125*b* of each retaining arm 124*a*, 124*b* has a bend, so that the free ends 125*a*, 125*b* can each form a type of hook, by means of which the two retaining arms 124*a*, 124*b* can be hooked into respective openings 216*a*. 216*b* formed in the current bar 210.

FIGS. 2 and 3 show a current bar 210, to which two of the clamping springs 100 shown in FIG. 1 are fastened. The clamping springs 100 are retained on the current bar 210 in a positive-locking manner by means of the two retaining arms 124*a*. 124*b* of the retaining leg 110, which are led through the openings 216*a*. 216*b* in the current bar 210. The initial position of the clamping spring 100 is shown here: in this initial position, the clamping edge 116 of the clamping leg 111 of the clamping springs 100 abuts against the current bar 210. Due to the preloading of the clamping leg 111, the two clamping springs 100 are tensioned against the current bar 210. A closed force system can thus be formed between each clamping spring 100 and the current bar 210, since the clamping spring is fixed and braced on the current bar 210 in three directions (x-, y-, and z-directions), as indicated in FIG. 2.

FIGS. 4 and 5 show a connecting terminal 300, in which a connecting assembly 200 having a corresponding clamping spring 100 is arranged. Here, the clamping leg 111 of the clamping spring 100 is arranged in an open position, so that the conductor connection space 212 is released. In this open position, the clamping spring 100 and the actuating element 211 are braced with one another so that the clamping spring 100 and the actuating element 211 form a closed force system, in which the actuating element 211 is held in position by the clamping spring 100 without additional aids, and the clamping spring 100 is in turn held in position by the actuating element 211.

The actuating element 211 is braced with the clamping spring 100 in that, in the open position, the clamping spring 100 applies two, oppositely-acting compressive forces D1, D2 to the actuating element 211. As a result of these two, oppositely-acting compressive forces D1, D2, the actuating element 211 and thus also the clamping spring 100 can be held in a stable, stationary position.

The first compressive force D1 acts upon the actuating element 211 counter to the actuation direction B. The first compressive force D1 is applied to the actuating element 211 by the clamping leg 111, and in particular by the side tabs 115*a*, 115*b* of the clamping leg 111. The side tabs 115*a*. 115*b* press on the actuating surfaces 214*a*, 214*b* of the actuating element 211 with the first compressive force D1 applied by the spring effect of the clamping leg 111.

The second compressive force D2 acts upon the actuating element 211 in the actuation direction B. The second compressive force D2 is applied to the actuating element 211 by the locking leg 112 of the clamping spring 100 in that the retaining arms 122*a*. 122*b* of the locking leg 112 are retained on the retaining contour 215*a*. 215*b* of the actuating element 211.

The conductor 400 to be connected which is shown here deviates from the desired conductor insertion direction $E_s$, since this conductor has a small conductor cross-section such that the conductor 400 tilts during insertion into the connecting terminal 300 via the conductor insertion opening 311, as can be seen in FIG. 5. In this case, the conductor 400 is thus inserted into the conductor connection space 212 in a conductor insertion direction E so as to be oblique or inclined to the desired conductor insertion direction $E_s$.

The funnel-shaped conductor insertion opening 311 has a wall portion 313 which is aligned with the first conductor contact surface 120 of the locking leg 112 of the clamping spring 100. When the conductor 400 is tilted, the conductor 400 contacts this wall portion 313 of the funnel-shaped conductor insertion opening, so that the conductor 400 is guided along this wall portion 313 to the first conductor contact surface 120 of the pressing surface 117 of the locking leg 112, and the end face 410 of the conductor 400 comes into contact with the first conductor contact surface 120, as can be seen in FIG. 5. Without the risk of the conductor 400 slipping from the first conductor contact surface 120 and thus from the pressing surface 117, the conductor can now apply a compressive force to the locking leg 112, so that the locking leg can be pivoted from the retaining position, which is shown in FIGS. 4 and 5, into the releasing position. The pivot point of the locking leg 112 during the movement from the retaining position into the releasing position lies in the region of the connection portion 119.

As a result of the abutting of the end face 410 of the conductor 400 against the pressing surface 117 by contact with the first conductor contact surface 120, the locking leg 112 is pivoted in the desired conductor insertion direction $E_s$ so that the locking leg 112 disengages from the retaining contour 215*a*, 215*b* of the actuating element 211.

As soon as the locking leg 112 is released from the actuating element 211 and is thus in the releasing position, the bracing of the clamping spring 100 with the actuating element 211 is released, since the locking leg 112 no longer exerts a second compressive force D2 on the actuating element 211. Thus, only the first compressive force D1 applied by the clamping leg 111 to the actuating element 211 still acts upon the actuating element 211, and thus the clamping leg 111 can displace the actuating element 211 upwards, counter to the actuation direction B by the spring force of the clamping leg 111, as a result of which the clamping leg 111 also moves towards the conductor 400 inserted into the conductor connection space 212 in order to press said conductor against the current bar 210 by means of the clamping tab 114 of the clamping leg 111, and thus to clamp and connect the conductor 400 against the current bar 210.

This makes it reliably possible to connect and clamp a conductor 400—in particular, a conductor 300 with a small conductor cross-section—without additional assistance.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Clamping spring
110 Retaining leg
111 Clamping leg
112 Locking leg
113 Arcuate portion
114 Clamping tab
**115*a*, 115*b*** Side tab
116 Clamping edge
117 Pressing surface
118 Free end
119 Connection portion
120 First conductor contact surface
121 Second conductor contact surface
123 Curved portion
**124*a*, 124*b*** Retaining arm
**125*a*, 125*b*** Free end
200 Connecting assembly
210 Current bar
211 Actuating element
212 Conductor connection space
**213*a*, 213*b*** Actuating arm
**214*a*, 214*b*** Actuating surface
**215*a*, 215*b*** Retaining contour
**216*a*, 216*b*** Opening
300 Connecting terminal
310 Housing
311 Conductor insertion opening
312 Mouth
313 Wall portion
400 Conductor
410 End face
B Actuation direction
D1 First pressure force
D2 Second pressure force
E Conductor insertion direction
$E_s$ Desired conductor insertion direction
α Angle
β Angle

The invention claimed is:

1. A clamping spring for clamping a conductor, to be connected against a current bar, the clamping spring comprising:
a retaining leg;
a clamping leg movable into an open position and into a clamping position; and
a locking leg movable into a retaining position and into a releasing position,
wherein, in the retaining position, the locking leg is retained on an actuating element, and, in the releasing position, the locking leg is released from the actuating element,
wherein the locking leg has a pressing surface, by which the locking leg is movable from the retaining position into the releasing position by the conductor, and
wherein the pressing surface has a portion which is curved in a direction of the clamping leg and on which comprises a first conductor contact surface.

2. The clamping spring of claim 1, wherein the locking leg has a free end, along which the pressing surface extends and on which a second conductor contact surface is formed.

3. The clamping spring of claim 2, wherein the first conductor contact surface extends at an angle of 140°≤α≤170° to the second conductor contact surface.

4. The clamping spring of claim 1, wherein the locking leg is resiliently connected to the retaining leg by a connection portion.

5. The clamping spring of claim 4, wherein, in a region of the connection portion, the locking leg tapers towards the retaining leg.

6. The clamping spring of claim 4, wherein the retaining leg has at least one retaining arm configured to retain the retaining leg on the current bar.

7. The clamping spring of claim 6, wherein the retaining leg has a first retaining arm and a second retaining arm, and
wherein the connection portion is arranged between the first retaining arm and the second retaining arm.

8. A connecting assembly for connecting an electrical conductor, comprising:
a current bar;
the clamping spring of claim 1; and
an actuating element,
wherein the actuating element has a retaining contour configured to retain the locking leg of the clamping spring in the retaining position.

9. The connecting assembly of claim 8, wherein the current bar has at least one opening into which the clamping spring is hooked by at least one retaining arm of the retaining leg.

10. A connecting terminal, comprising:
a housing; and
at least one connecting assembly of claim 8 arranged in the housing.

11. The connecting terminal of claim 10, wherein the housing has at least one funnel-shaped conductor insertion opening, which has a wall portion aligned with the first conductor contact surface of the locking leg of the clamping spring.

12. An electronic device, comprising:
at least one connecting assembly of claim 8; and/or
at least one connecting terminal, comprising:
a housing; and
at least one connecting assembly of claim 8 arranged in the housing.

13. The connecting terminal of claim 10, wherein the connecting terminal comprises a terminal block.

* * * * *